(12) United States Patent
Singh et al.

(10) Patent No.: US 9,660,866 B1
(45) Date of Patent: May 23, 2017

(54) READINESS DETECTION FOR DATA PLANE CONFIGURATION OF LABEL-SWITCHED PATHS

(71) Applicant: Juniper Networks, Inc., Sunnyvale, CA (US)

(72) Inventors: Ravi Singh, San Jose, CA (US); Raveendra Torvi, Nashua, NH (US); Yakov Rekhter, New York, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 333 days.

(21) Appl. No.: 14/587,659

(22) Filed: Dec. 31, 2014

(51) Int. Cl.
*H04J 1/16* (2006.01)
*H04L 12/24* (2006.01)
*H04L 12/803* (2013.01)
*H04L 12/723* (2013.01)
*H04L 12/26* (2006.01)

(52) U.S. Cl.
CPC ...... *H04L 41/0816* (2013.01); *H04L 43/0817* (2013.01); *H04L 45/50* (2013.01); *H04L 47/125* (2013.01)

(58) Field of Classification Search
CPC .................................................... H04L 47/125
USPC ......................................................... 370/236
See application file for complete search history.

(56) References Cited

U.S. PATENT DOCUMENTS

| | | | |
|---|---|---|---|
| 7,184,437 B1 | 2/2007 | Cole et al. | |
| 8,050,559 B2 | 11/2011 | Sindhu | |
| 8,339,959 B1 | 12/2012 | Moisand et al. | |
| 8,626,820 B1 * | 1/2014 | Levy | G06F 11/1004 709/201 |
| 2008/0225865 A1 * | 9/2008 | Herzog | H04W 76/045 370/401 |
| 2009/0219906 A1 * | 9/2009 | Motegi | H04W 72/042 370/342 |
| 2011/0141952 A1 * | 6/2011 | Wang | H04L 1/1812 370/294 |
| 2013/0153298 A1 * | 6/2013 | Pietraski | H04L 5/001 175/45 |

OTHER PUBLICATIONS

Awduche et al., "RSVP-TE: Extensions to RSVP for LSP Tunnels," Network Working Group, rfc 3209, Standards Track, Dec. 2001, 61 pp.

(Continued)

*Primary Examiner* — Shripal Khajuria
(74) *Attorney, Agent, or Firm* — Shumaker & Sieffert, P.A.

(57) ABSTRACT

Techniques are described for generating a No-Acknowledgement (NACK) message if the installation of a route for a label-switched path at a router has failed or is likely to fail. In some examples, a network device includes at least one processor and at least one module operable by the at least one processor to: receive a request to forward network packets for an LSP; responsive to receiving the request, initiate configuration of at least one forwarding unit of the network device to forward network packets for the LSP; generate a NACK message that indicates the at least one forwarding unit is not configured to forward the network packets for the LSP; and terminate based at least in part on the NACK message, the configuration of the at least one forwarding unit for the LSP.

27 Claims, 5 Drawing Sheets

(56) References Cited

OTHER PUBLICATIONS

Braden et al., "Resource ReSerVation Protocol (RSVP)," Network Working Group, rfc 2205, Standards Track, Sep. 1997, 112 pp.
Farrel et al., "Encoding of Attributes for MPLS LSP Establishment Using Resource Reservation Protocol Traffic Engineering (RSVP-TE)," Network Working Group, rfc 5420, Standards Track, Feb. 2009, 23 pp.

* cited by examiner

READINESS DETECTION FOR DATA PLANE CONFIGURATION OF LABEL-SWITCHED PATHS

TECHNICAL FIELD

The invention relates to computer networks and, more particularly, to engineering traffic flows within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the Intermediate System—Intermediate System (ISIS) protocol or the Open Shortest Path First (OSPF) protocol.

Head-end routers of an LSP are commonly known as ingress routers, while routers at the tail-end of the LSP are commonly known as egress routers. Ingress and egress routers, as well as intermediate routers along the LSP that support MPLS, are referred to generally as label switching routers (LSRs). A set of packets to be forwarded along the LSP is referred to as a forwarding equivalence class (FEC). A plurality of FECs may exist for each LSP, although there may, in some examples, be only one active LSP for any given FEC. Typically, a FEC definition includes the IP address of the destination of the LSP, e.g., an IP address assigned to the egress router of the LSP. In general, each router along the LSP maintains a context that associates a FEC with an incoming label and an outgoing label. The ingress label edge router (LER) uses routing information, propagated from the egress LER, to determine the LSP, to assign labels for the LSP, and to affix a label to each packet of the FEC. The LSRs use MPLS protocols to receive MPLS label mappings from downstream LSRs and to advertise MPLS label mappings to upstream LSRs. When an LSR receives an MPLS packet from an upstream router, the LSR performs a lookup in the context and swaps the MPLS label according to the information in its forwarding table based on the lookup and forwards the packet to the appropriate downstream LSR or LER. The egress LER removes the label from the packet and forwards the packet to its destination in accordance with non-label based packet forwarding techniques.

When initially configuring an LSP, a particular LSR, for example, may propagate a label to an upstream LER included in the LSP. The upstream LER then applies the label when forwarding packets for the LSP to the particular LSR. The particular LSR may also configure one or more of its forwarding units to process the label for any received packets. However, when configuring the forwarding units in the particular LSR, various factors, such as system load or capacity may introduce some time delay before the forwarding units of the particular LSR are configured for the LSP. Accordingly, if the upstream LER begins forwarding packets using the LSP prior to the particular LSR completing the confirmation of its forwarding plane for the LSP, the particular LSR may drop such packets for the LSP until the configuration is completed.

SUMMARY

In general, techniques are described for generating a No-Acknowledgement (NACK) message if the installation of a route for an LSP at a router has failed or is likely to fail. For instance, when installing a route for an LSP, the router may generate a route-add message that is internally processed by the kernel of the router to configure the forwarding units of the router. The router may also maintain state information for the route-add message to verify that the route has been successfully installed. If the router later determines that the kernel has generated an ACK message in response to successfully configuring the forwarding units, the router may remove the state information for the route-add message and forward network packets for the LSP.

If, however, the installation of the route for the LSP has failed or is likely to fail due to one or more factors (e.g., system health, system capacity, etc.), the router may generate a NACK message. Rather than assuming that the LSP was successfully configured although no ACK message was generated within a defined time duration, techniques of the disclosure generate the NACK message to indicate the LSP has failed or is likely to fail. By generating a NACK message if the route installation has failed or is likely to fail, the router is able to definitively verify whether the route installation for the LSP has succeeded. In this way, techniques of the disclosure may provide a deterministic way to verify whether installation of the route for the LSP has failed, rather than assuming that route installation has succeeded after a defined time duration has expired in which no ACK message was generated.

Accordingly, a router that implements NACK messages may more quickly notify one or more other routers included in the LSP that the route installation has failed or is unlikely to succeed. The techniques may therefore potentially reduce the amount of dropped packets that would otherwise have occurred if the route installation had failed but was assumed to be successful over a defined time duration before the installation failure was detected. In some examples, techniques of the disclosure may improve the management of storage resources for the state information by removing such state information in response to a NACK message rather than waiting a defined time duration before determining the installation has failed.

In some examples, a method includes receiving, by a network device of a plurality of network devices, a request to forward network packets for a label-switched path (LSP); responsive to receiving the request, initiating, by the network device, configuration of at least one forwarding unit of the network device to forward network packets for the LSP; generating, by the network device, a no-acknowledgement (NACK) message that indicates the at least one forwarding unit is not configured to forward the network packets for the LSP; and terminating, by the network device and based at least in part on the NACK message, the configuration of the at least one forwarding unit for the LSP.

In some examples, a network device includes at least one processor; at least one module operable by the at least one processor to: receive a request to forward network packets for a label-switched path (LSP); responsive to receiving the request, initiate configuration of at least one forwarding unit of the network device to forward network packets for the LSP; generate a no-acknowledgement (NACK) message that indicates the at least one forwarding unit is not configured to forward the network packets for the LSP; and terminate based at least in part on the NACK message, the configuration of the at least one forwarding unit for the LSP.

In some examples, a computer-readable medium includes instructions for causing a programmable processor of a network device to: receive a request to forward network packets for a label-switched path (LSP); responsive to receiving the request, initiate configuration of at least one forwarding unit of the network device to forward network packets for the LSP; generate a no-acknowledgement (NACK) message that indicates the at least one forwarding unit is not configured to forward the network packets for the LSP; and terminate based at least in part on the NACK message, the configuration of the at least one forwarding unit for the LSP.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
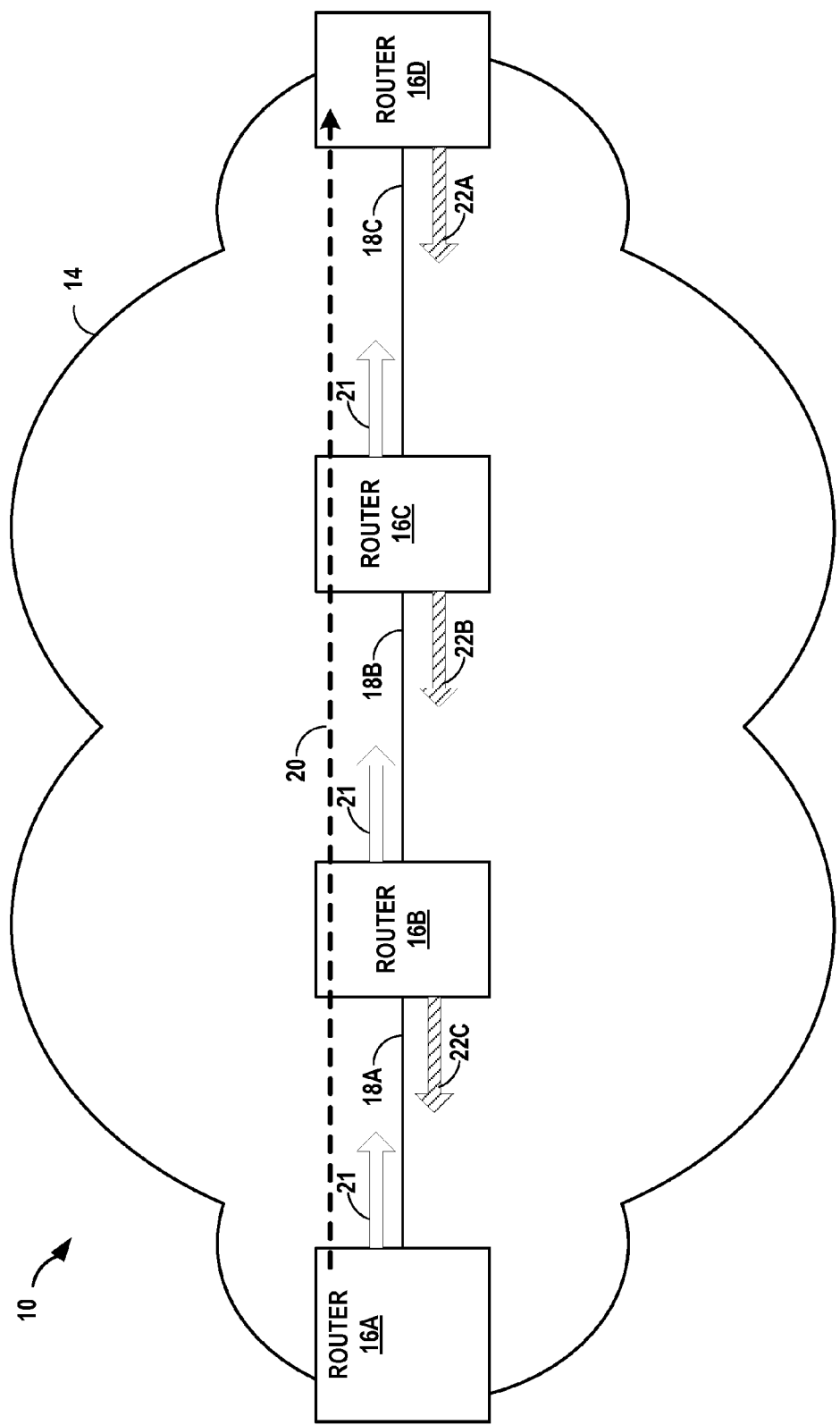
FIG. 1 is a block diagram illustrating an example system in which one or more routers are configured to operate in accordance with techniques described in this disclosure.

FIG. 1 is a block diagram illustrating an example system 10 in which one or more of routers 16A-16D are configured to operate in accordance with techniques described in this disclosure. Each of routers 16 represents any network device that routes or otherwise forwards traffic through network 14. For example, routers 16 may each represent a L3 packet-switching device that operates at L3 to exchange routing information using a routing protocol for Internet protocol (IP) networks, such as link state protocols including the open shortest path first (OSPF) routing protocol and/or the intermediate-system-intermediate-system (IS-IS) routing protocol, describing a link state of each of links 18A-18C of network 14. Links 18A-18C may each be physical or wireless connections between routers 16. Routers 16 then process this routing information to form a representation (e.g., in the form of a graph data structure) of network 14, selecting paths through its representation of the topology of network 14 to reach all available destinations to generate forwarding information. In other words, routers 16 reduce these paths to so-called "next hops" which identify interfaces to which to forward traffic destined for a particular destination, where the forwarding information includes this list of next hops. Routers 14 then install this forwarding information in a forwarding plane of the router, whereupon the forwarding plane forwards received traffic in accordance with the forwarding information.

In some examples, network 14 may be a service provider network. For example, network 14 may represent one or more networks owned and operated by a service provider (which is commonly a private entity) that offer one or more services for consumption by subscriber networks. In this context, network 14 is typically a layer three (L3) packet-switched network that provides L3 connectivity between a public network and one or more subscriber networks (not shown). Often, this L3 connectivity provided by a service provider network is marketed as a data service or Internet service, and subscribers may subscribe to this data service. Network 14 may represent a L3 packet-switched network that provides data, voice, television and any other type of service for purchase by subscribers and subsequent consumption by subscriber networks.

While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

In any event, various ones of the services offered by network 14 may be enabled through the establishment of a label switched path (LSP). Multi-protocol Label Switching (MPLS) is a mechanism used to engineer traffic patterns via LSPs within IP networks, such as network 14. By using MPLS, a source device, such as router 16A, can request a path through a network, i.e., a Label Switched Path (LSP) shown as LSP 20 in the example of FIG. 1. An LSP defines a distinct path through the network to carry MPLS packets from the source device, i.e., again router 16A in the example of FIG. 1, to a destination device, i.e., router 16D in the example of FIG. 1. Router 16A may admit packets to LSP 20 and, as a result, may be referred as ingress router 16A of LSP 20. After admitting the packets to LSP 20, router 16A may append a short label associated with LSP 20 to packets that travel through network 14 via LSP 20. Routers 16B-16D along the path cooperatively perform MPLS operations to forward the MPLS packets along established LSP 20. LSPs may generally be used for a variety of traffic engineering purposes including bandwidth management and quality of service (QoS). A packet may be a formatted set of data.

Router 16A may employ one of a variety of protocols to establish LSP 20. For example, router 16A may use a label distribution protocol (LDP) to establish LSP 20. Router 16A may, in some examples, use a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by a link-state interior routing protocol, such as the ISIS protocol or the OSPF protocol.

In the example of FIG. 1, routers 16A-16D are assumed to have used RSVP-TE to establish a traffic engineered LSP, which is shown as LSP 20. Router 16A configures LSP 20 via RSVP-TE to traverse router 16B and router 16C with an egress of router 16D (which may also be referred to as "egress router 16D"). Although not shown in the example of FIG. 1, additional intervening or transit routers may also be used in support of LSP 20. Furthermore, LSP 20 does not necessarily require four routers 16A-16D, but may be configured using as few as two routers up to any number of routers. More information regarding RSVP may be found in a request for comments (RFC) 2205, entitled "Resource ReSerVation Protocol (RSVP)—Version 1 Functional Specification," dated September 1997, the entire contents of which is hereby incorporated by reference in its entirety. More specific information regarding RSVP-TE explaining how RSVP may be extended for LSPs can be found in RFC 3209, entitled "RSVP-TE: Extensions to RSVP for LSP tunnels," dated December 2001, the entire contents of which is hereby incorporated by reference in its entirety. Additional information regarding how to establish an LSP in accordance with RSVP-TE may be found in RFC 5420, entitled "Encoding of Attributes for MPLS LSP Establishment Using Resource Reservation Protocol Traffic Engineering (RSVP-TE)," dated February 2009, the entire contents of which are hereby incorporated by reference in its entirety.

To establish LSP 20 in accordance with RSVP-TE, router 16A may send path message 21 to router 16B. Path message 21 may represent a request to bind labels to a specific LSP tunnel (i.e., LSP 20 in the example of FIG. 1). Routers 16B and 16C may forward path message 21 until it reaches the egress network device for LSP 20, which in the example of FIG. 1 is represented by router 16D. Path message 21 may signal this path from router 16B to router 16C with an egress of router 16D using an EXPLICIT_ROUTE object, so that routers 16B and 16C may determine how to forward path message 21 such that path message 21 reaches router 16D along the appropriate route.

In response to receiving this path message 21, each downstream router from router 16A, such as router 16C and router 16D, may perform call admission control to reserve resources for LSP 20, such as bandwidth or other resources required to support a given bandwidth, quality of service (QoS), and the like to provide a few examples. Router 16C may allocate a label in response to a LABEL REQUEST object specified in path message 21 upon successful call admission control. Upon allocating the label, router 16C may program a forwarding plane of router 16C, which represents a logical or actual plane of router 16C that is responsible for forwarding packets. Router 16C may include a control plane of the control unit that is logically or, in some instances, physical separate from the forwarding plane. The control plane of router 16C may execute the routing protocols responsible for maintaining or otherwise determining the topology of the network. The control plane may distill this topology, e.g., stored in the form of a routing information base (RIB), into forwarding information, which is then installed in the forwarding plane, e.g., in the form of a forwarding information base (FIB). The control plane may issue messages to the forwarding plane to install this label within the forwarding plane. The control plane may also verify successful install of this label within the forwarding plane. Once the forwarding plane has been successfully programmed, router 16C may generate a Resv message 22B (or "label-switched path configuration message 22B") that includes this label and pass this Resv message 22B to the adjacent upstream router along the LSP to be established, i.e., LSP 20 in this example. This adjacent upstream router is shown in the example of FIG. 1 as router 16B.

Router 16B may, in response to receiving Resv message 22B, may perform call admission control to determine whether sufficient resources are available within router 16B to support LSP 20. Router 16B may compare the request for LSP 20 as signaled via path message 21 and evaluate the request in terms of the currently available resources. Upon successful call admission control, router 16B may allocate a label for use in supporting LSP 20 and program a forwarding plane of router 16B with the newly allocated label. Router 16B may, transmit the update Resv message 22B as Resv message 22C to adjacent upstream router 16A along LSP 20. In some examples, router 16D may perform similar techniques for Resv message 22A as described with respect to routers 16B and 16C. Router 16A may, upon receipt of Resv message 22C, update a forwarding plane of router 16A based on Resv message 22C to establish LSP 20 through network 14.

Accordingly, when router 16A forwards a packet in the LSP to router 16B, router 16A applies an incoming label previously received in Resv message 22C to the packet and forwards the packet to router 16B. Router 16B performs a lookup, based on the incoming label, and swaps the label with an outgoing label received from router 16C in Resv message 22B. Router 16B, upon applying the outgoing label received from router 16C, forwards the packet to router 16C. Router 16C performs a similar label-swapping operation and forwards the packet with the outgoing label to router 16D. In this way, the packet is forwarded in LSP 20 based on labels initially exchanged by routers 16A-16D.

In the example described with respect to FIG. 1, the forwarding plane of router 16C may be configured to perform a lookup for a packet based on the incoming label, apply an outgoing label received from router 16D to the packet, and forward the packet using an interface that corresponds to link 18C. To configure the forwarding plane of router 16C to process packets for LSP 20, the control plane of router 16C may initiate a route-installation process for LSP 20. As part of the route-installation process, the control plane of router 16C may generate a route-add message that includes data, such as the route definition for LSP 20, to configure the forwarding plane of router 16C to process packets for LSP 20.

Figure 2:
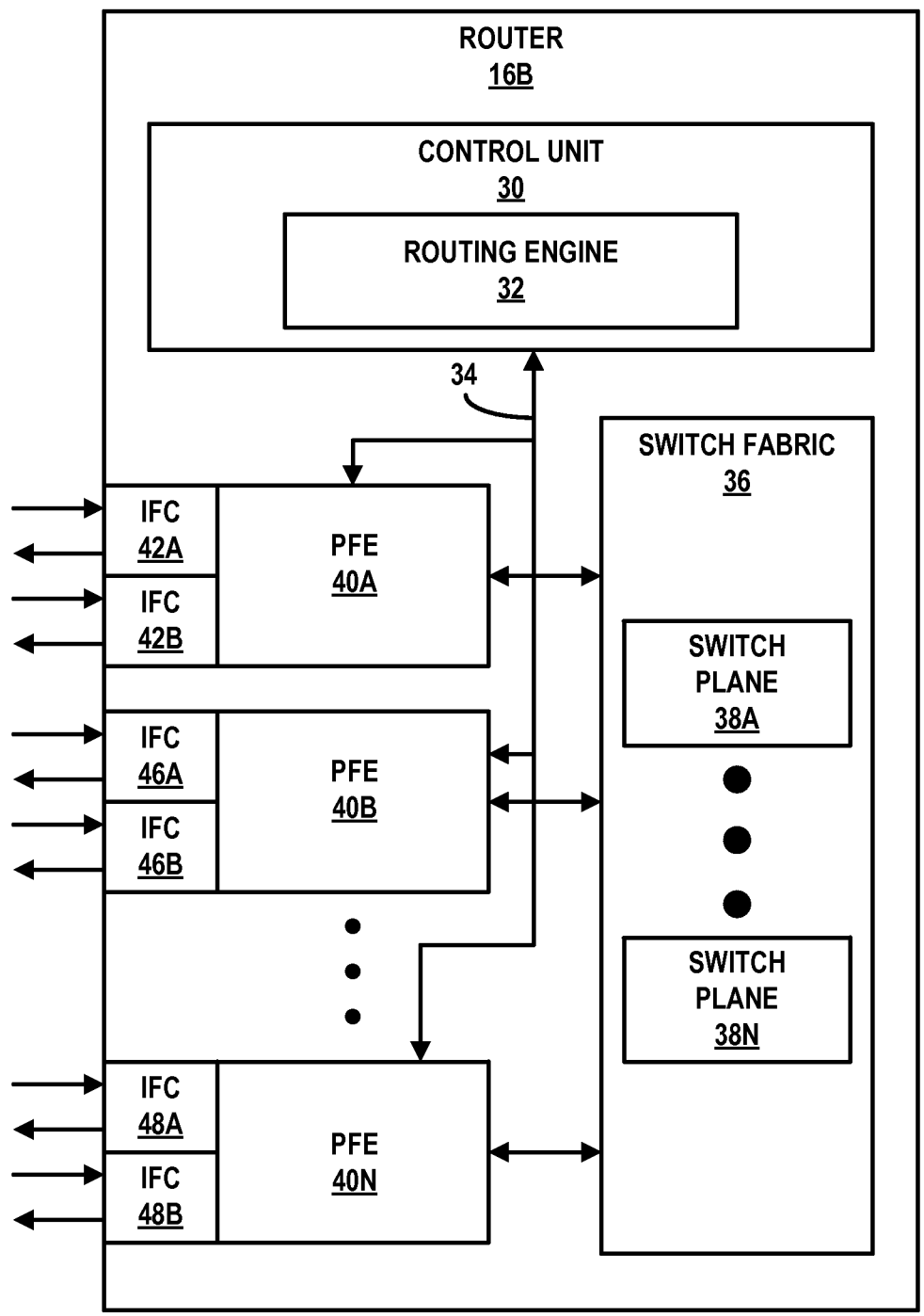
FIG. 2 is a block diagram illustrating an example router of FIG. 1 in greater detail, in accordance with techniques of the disclosure.
Figure 3:
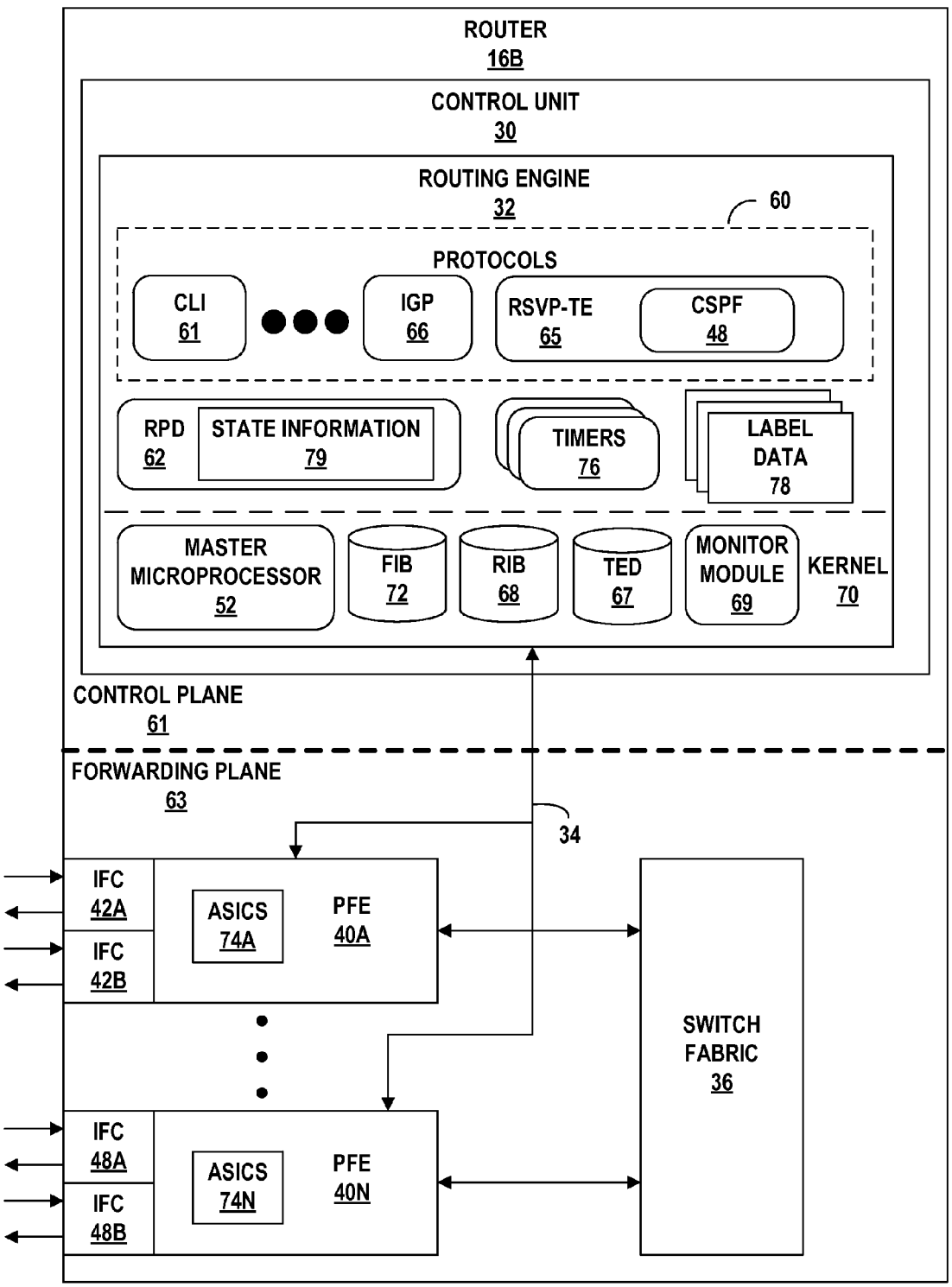
FIG. 3 is a block diagram illustrating an exemplary router implementing NACK messages, in accordance with techniques of this disclosure.

As further illustrated in FIGS. 2-3, the forwarding plane of router 16C may include on or more forwarding units that are configured based on the route-add message to perform a lookup based on an incoming label of a packet, swap the incoming label with an outgoing label, and forward the packet with the outgoing label on the appropriate interface to the next hop in the LSP. To verify that configuration of the forwarding units for a particular route-add message was successful, the control plane of router 16C may implement route acknowledgement messages (Route-ACKs or "ACKs") between forwarding units in the forwarding plane and a routing engine in a control plane. In particular, the control plane of router 16C may maintain state information, such as an identifier, for each route-add message that is sent to the forwarding plane. In some examples, the control plane of router 16C may wait for an ACK message from the forwarding plane that indicates the forwarding plane was successfully configured for the LSP before removing the state information corresponding to the route-add message. In this way, the control plane of router 16C may maintain state information for route-add messages to determine whether configuration of the forwarding plane based on the messages was successful.

Conventionally, some routers, when installing a route for an LSP, waited to receive an ACK message from the forwarding plane before the router sent its incoming label for the LSP upstream. In this way, the router may have avoided dropping pockets for the LSP before the forwarding plane of the router was configured for the LSP. As networks have scaled to include larger numbers of routers and greater numbers of LSPs, demands on control plane resources have increased for maintaining state information, such as an identifier, for each route-add message that was sent to the forwarding plane and each corresponding ACK message that is expected in receipt. For instance, the control plane may include a finite amount of shared memory to maintain state information for not just LSP route-add messages, but any messages to configure forwarding units for any number of protocols. Accordingly, as the number configuration messages, such as route-add messages, increases due to the larger number of routers, the limitations on memory to store such state information may be reached. For instance, when the rate of generating route-add messages remains higher than rate of ACK messages being received from the forwarding units, sustained differences between the two rates may exhaust the available storage resources for subsequent route-add messages.

In addition to storage limitations, as forwarding units are subjected to heavier loads when forwarding network packets, configuration of forwarding units may be delayed and/or the generation of the ACK message may be delayed. As such, control planes of some routers may be configured to assume, after a particular timer duration, that although an ACK message has not yet been received by the control plane, the LSP has been successfully configured in the forwarding units. Such a router may be configured to assume that the LSP has been successfully configured in its forwarding plane because there is some delay due to system load/health or because there is not enough storage space for the state information to continue waiting for the ACK message. While the LSP may be successfully configured by a particular router in some instances, in other instances, the LSP may not have been successfully configured. When the particular router has not successfully configured for the LSP, the particular router may drop packets for the LSP until the upstream router or the particular router itself determines that the LSP must be torn down or otherwise deleted.

Techniques of this disclosure implement a No-Acknowledgement (NACK) message that may eliminate the need for a router to assume that a particular route for an LSP was successfully configured or not configured. Rather than waiting for a defined time duration and assuming that the LSP was still successfully configured, although an ACK message was not received for the route, techniques of the disclosure generate a NACK message if the installation of the route for the LSP has failed or is likely to fail due to one or more factors (e.g., system load, monitored health, etc.). Accordingly, by generating a NACK if the installation of the route for the LSP has failed or is likely to fail, the router is able to definitively determine whether route installation for the LSP has succeeded or has failed (or is likely to fail).

In other words, in some examples, a router implementing techniques of the disclosure may expressly wait to receive an ACK message or NACK message before sending its incoming label upstream, and take one or more actions described in this disclosure if a NACK message is generated by the router. In this way, techniques of the disclosure may provide a deterministic way to determine whether installation of the route for the LSP has failed or is likely to fail (i.e., receipt of a NACK message), rather than assuming that route installation has succeeded after a particular timer duration has expired in which no ACK message was received. As such, a router that uses NACK messages may more quickly notify one or more other routers that the route installation has failed or is unlikely to succeed. The techniques may therefore potentially reduce the amount of dropped packets that would otherwise have occurred if the route installation had failed but was assumed to be successful over a duration of time before the installation failure was detected. Techniques of the disclosure are now further described with respect to FIG. 1.

In operation, router 16B may receive a request to forward network packets for a label-switched path (LSP). In some examples, a request may be path message 21 or path message 22B, which may represent a request to bind one or more labels to a specific LSP tunnel, such as LSP 20 in FIG. 1. Responsive to receiving the request, router 16B may initiate configuration of at least one forwarding unit of the network device to forward network packets for LSP 20. For instance, a Routing Protocol Daemon (RPD) of the control plane of router 16B, as further illustrated in FIG. 3, may generate a route-add message that includes information to configure at least one forwarding unit of router 16B to forward network packets for LSP 20. The RPD of the control plane may send the route-add message to a kernel of router 16B that configures the forwarding units of router 16B. The RPD may also store state information corresponding to the route-add message (e.g., an identifier) in order to track an expected ACK from the kernel of router 16B upon completion of the configuration.

The kernel of router 16B may execute one or more operations, based on data included in the route-add message, to install at least one route corresponding to LSP 20 into one or more forwarding units of router 16B. For instance, the route-add message may include identifiers of one or more forwarding units, one or more route definitions for LSP 20, identifiers of one or more interfaces, MPLS labels, layer 2 and/or 3 network addresses, to name only a few examples of information, that may be used to configure forwarding units of router 16B to forward network packets for LSP 20. In some examples, the kernel may determine that the one or more forwarding units have been successfully configured in the forwarding plane of router 16B. For instance, the kernel may determine a status code that indicates the one or more forwarding units have been successfully configured to forward network packets for LSP 20. Accordingly, the kernel of router 16B may send an ACK message to the RPD of router 16B. Upon receiving the ACK message, the RPD may perform one or more operations, such as causing the control plane of router 16B to send its incoming label upstream to router 16A. In this way, router 16A may forward network packets for LSP 20 to router 16B by applying the incoming label advertised by router 16B to the packet.

In accordance with techniques of the disclosure, if the kernel of router 16B determines that the one or more forwarding units of router 16B, for which configuration was initiated based on the route-add message for LSP 20, are either unable or unlikely to be configured to forward network packets for LSP 20, the kernel may generate a NACK message. For instance, if the kernel of router 16B determines from the one or more forwarding units of router 16B that the installation of the route for LSP 20 has definitively failed, the kernel may generate the NACK message. In some examples, as further described in this disclosure, the kernel of router 16B may preemptively determine, before the configuration has actually failed, that the installation of the route in the one or more forwarding units of router 16B is likely to fail. For instance, the kernel of router 16B may determine based on one or more system health metrics, such as memory and/or processing load of one or more forwarding units, that the installation of the route for LSP 20 into the one or more forwarding units of router 16B is likely to fail. Upon determining that the installation of the route is likely to fail, the kernel may generate a NACK message.

Responsive to generating the NACK message, the kernel of router 16B may send the NACK message to the RPD of router 16B. Router 16B may, based on the NACK message, terminate the configuration of the at least one forwarding unit for LSP 20. For instance, if at least one of the one or more forwarding units was successfully configured for LSP 20 but a different one of the one or more forwarding units failed to be configured, the RPD may send instructions to the kernel of router 16B to undo the configuration for LSP 20 or otherwise re-configure any forwarding units to not forward packets for LSP 20. Router 16B may also remove state information corresponding to the route-add message for LSP 20.

In some examples, upon receiving a NACK, the RPD for router 16B may notify one or more other routers of network 14 that the installation of the route for LSP 20 was not successful. For instance router 16B may send a path error (PathErr) message toward ingress router 16A and/or send a path tear-down (PathTear) message toward egress router 16D. A path error message may notify an upstream router, such as router 16A, that a node in LSP 20 was unable to forward network packets for LSP 20. Router 16A may determine a different set of one or more nodes to forward network packets for LSP 20. A path tear-down message may notify a downstream router, such as router 16D, to tear down LSP 20 or otherwise undo any configuration of its forwarding plane to forward packets for LSP 20, such that router 16D will not forward or receive network packets for LSP 20. In some examples, each router that receives a PathErr message or a PathTear message may perform one or more operations described above with respect to the specific type of message. Techniques of the disclosure are further described with respect to FIGS. 2-5.

FIG. 2 is a block diagram illustrating example router 16B of FIG. 1 in greater detail, in accordance with techniques of the disclosure. Router 16B includes control unit 30, switch fabric 36, and Packet Forwarding Engines (PFEs or "forwarding units") 40A-40N ("PFEs 40"), capable of implementing techniques of the disclosure. PFEs 40 may receive and send data via interface cards 42A-42B, 46A-46B, and 48A-48B ("IFCs 42", "IFCs 46", and "IFCs 48", respectively). In other embodiments, each of PFEs 40 may comprise more or fewer IFCs. Switch fabric 36 provides an interconnect mechanism for forwarding data between PFEs 30 for transmission over a network, e.g., the Internet.

Routing engine 32 maintains routing tables, executes routing protocol and controls user access to router 16B. In this example, routing engine 32 is connected to each of PFEs 30 by a dedicated link 34, which may be an internal Ethernet link. For example, dedicated link 34 may comprise a 100 Mbps Ethernet connection. Routing engine 32 maintains routing information that describes a topology of a network, and derives a forwarding information base (FIB) in accordance with the routing information. Routing engine 32 copies the FIB to each of PFEs 40. This allows the FIB in each of PFEs 40 to be updated without degrading packet forwarding performance of router 16B. Alternatively, routing engine 32 may derive separate FIBs which are copied to respective PFEs 40.

Control unit 30 provides an environment for storing L2 network topology information, e.g., spanning tree information, executing CFM protocols to provide fault isolation and detection over large L2 networks, and providing a management interface to allow user access and configuration of router 16B. The operating environment of control unit 30 may be implemented solely in software, or hardware, or may be implemented as a combination of software, hardware or firmware. For example, control unit 30 may include one or more processors which execute software instructions. In that case, control unit 30 may include various software modules or daemons, and may include a computer-readable storage medium, such as computer memory or hard disk, for storing executable instructions.

In a routing node, a "switch plane" is generally capable of providing a communication path between any two or more of PFEs 40. In this example, switch fabric 36 consists of multiple standalone switch planes 38A through 38N ("switch planes 38"). In some examples, each of switch planes 38 is provided by one or more switch fabric chips on one or more separate, removable switch cards. Other routing nodes that implement the techniques described herein may comprise additional or fewer switch planes, including a single switch plane. A majority of the switch planes 38 may be active at any given time with data packets distributed over the active switch planes. The one or more inactive switch planes of switch fabric 36 serve as back-up switch planes such that if one or more of the active switch planes goes offline, the back-up switch planes automatically activate, and the bandwidth capacity of router 16B is not diminished. The back-up switch planes may be identical to the active switch planes and act as hot spares to maintain bandwidth capacity in the event that one or more of the active switch planes fail. Each of switch planes 38 is operationally independent; therefore, router 16B may continue to forward packets as long as at least one of switch planes 38 remains active, but possibly at a reduced bandwidth capacity.

As part of a standalone router, switch planes 38 form a standalone switch fabric 36. That is, each of switch planes 38 is capable of providing a connection between any of PFEs 40 within router 16B. In this manner, switch planes 38 form a standalone switch fabric 36 that enables packet forwarding between the plurality of PFEs 40 of router 16B. For example, switch fabric 36 may be provided by a set of removable switch cards, where each removable switch card provides a respective one of switch planes 38.

In the example of FIG. 2, PFE 40A and PFE 40B may be ingress PFEs that receive network packets at one or more of interfaces 42A-42B and 46A-46B, respectively. Ingress PFEs 40A and 40B may route the network packets to PFE 40N, which may be an egress PFE. Consequently, egress PFE 40N may route network packets to other network devices via one or more of network interfaces 48A-48B.

In accordance with techniques of the disclosure, router 16B may receive path message 22B from router 16C to configure LSP 20 in network 14. Router 16B may receive path message 22B at one of interfaces 42-46. The corresponding PFE of the interface that received path message 22B sends the contents of path message 22B to routing engine 32. Routing engine 32, upon receiving the contents of path message 22B, determines one or more of PFEs 40 that may be configured to forward network packets for LSP 20. In particular, the one or more of PFEs 40 that may be configured to forward packets for LSP 20 may have egress interfaces that are coupled to downstream routers such as router 16C. Routing engine 32, may determine based on its knowledge of the network topology, that PFE 40N includes an interface that is coupled to router 16C or another router on a path to router 16C. Accordingly, routing engine 32 may generate a route-add message to configure the forwarding structures (e.g., lookup tables and ASICs, among other configurable components of the forwarding plane) of PFE 40A and PFE 40N, in the example of FIG. 2, to forward packets for LSP 20 via switch fabric 36 and using one or more interfaces of PFE 40A and PFE 40N. Routing engine 32 may store state information, such as an identifier of the route-add message in anticipation of receiving an ACK or NACK message that indicates whether the installation of the route succeeded or failed. In this way, routing engine 32 may clear the state information once the ACK or NACK message is determined by routing engine 32.

In some examples, the route-add message may include incoming label information for router 16B, which router 16B would advertise to upstream router 16A upon successful completion of the configuration of PFE 40A for LSP 20. When router 16A sends a packet having the incoming label for router 16B, PFE 40A would perform a lookup on the packet based on the incoming label, swap the incoming label with an outgoing label previously received from downstream router 16C and forward the packet to router 16C. Thus, PFE 40A may use the incoming label information of path message 22B to configure PFE 40A to perform such a lookup.

As described in FIG. 1, routing engine 32 may include a kernel that configures PFE 40A based on the route-add message. In some examples, the kernel may execute one or more operations that configure forwarding structures of PFE 40A in accordance with the data included in the route-add message. Upon receiving the route-add message, the kernel of routing engine 32 may initiate configuration of PFE 40A.

If PFE 40A is successfully configured in accordance with the route-add message, the kernel of routing engine 32 may generate an ACK message that may be processed by another component of routing engine 32, such as the RPD. In some examples, a component of router 16B may be software, hardware, or a combination of software and hardware. For instance, components of router 16B may include but are not limited to RPD 62, kernel 70, and PFEs 40 to name only a few examples. Upon determining the ACK message, routing engine 32 may generate a Resv message that includes the incoming label for router 16B. Routing engine 32 may send the Resv message to PFE 40A, which forwards the Resv message to upstream router 16A. Router 16A may configure its forwarding plane to apply the label contained in the Resv message to any packets for LSP 20 that are forwarded to router 16B. Router 16B may, upon performing a lookup of any such packets for LSP 20 based on the labels of the packets, swap the labels, and forward the packets to router 16C using an interface of PFE 40N.

In some examples, however, the installation of the route for LSP 20, based on the route-add message, may be unsuccessful or may be unlikely to succeed. For instance, in the example of FIG. 2, if the kernel of routing engine 32 determines that the route installation at PFE 40A has failed (e.g., the kernel received a hardware error code), the kernel may generate a NACK message. The NACK message may include an identifier that corresponds to the identifier of route-add message. Routing engine 32 may remove the state information corresponding to the route-add message, based on the identifier included in the NACK message that matches the identifier for the route-add message. In some examples, the kernel of router 16B may send the NACK message to another component of router 16B, such as the RPD, via interprocess communication or other suitable communication techniques.

Upon determining the NACK message, routing engine 32 may remove state information for the route-add message. Routing engine 32 may generate one or more messages to send to upstream and/or downstream routers for LSP 20. For instance, routing engine 32 may send one or more PathTear messages to downstream routers for LSP 20. Routing engine 32 may send one or more PathErr messages to upstream routers for LSP 20. In this way, routing engine 32 may determine in a deterministic manner, whether the installation of the path for LSP 20 succeeded. As such, routing engine 32 may remove state information for route-add messages more accurately, thereby using storage resources more efficiently. Furthermore, in some examples, techniques of the disclosure may not wait for a particular time duration before sending PathTear and/or PathErr messages, thereby preventing fewer dropped packets that would otherwise occur if the PathTear and/or PathErr messages were only sent after the expiration of the particular time duration.

FIG. 3 is a block diagram illustrating an exemplary router implementing NACK messages, in accordance with techniques of this disclosure. In the example of FIG. 3, router 16B includes control unit 30 in which routing engine 32 provides control plane functionality for router 16B. Router 16B also includes a plurality of packet-forwarding engines 40A-40N ("PFEs 40") and a switch fabric 36 that collectively provide a forwarding plane for forwarding network traffic. PFEs 40 receive and send data packets via interface cards 42, 48. In other embodiments, each of PFEs 40 may comprise more or fewer IFCs. Although not shown, PFEs 40 may each comprise a central processing unit (CPU) and a memory. In this example, routing engine 32 is connected to each of PFEs 40 by a dedicated internal communication link 34. For example, dedicated link 34 may comprise a Gigabit Ethernet connection. Switch fabric 36 provides a high-speed interconnect for forwarding incoming data packets between PFEs 40 for transmission over a network. U.S. patent application Ser. No. 11/832,342, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. patent application Ser. No. 11/832,342 are incorporated herein by reference.

Routing engine 32 provides an operating environment for execution of various protocols 60 that may comprise software processes having instructions executed by a computing environment. As described in further detail below, protocols 60 provide control plane functions for storing network topology in the form of routing tables or other structures, executing routing protocols to communicate with peer routing devices and maintain and update the routing tables, and providing management interface(s) to allow user access and configuration of router 16B. In this respect, routing engine 32 represents hardware or a combination of hardware and software that implements routing protocol daemon 62 ("RPD 62") and routing protocols 60 by which routing information, stored in a routing information base 68 ("RIB 68"), may be exchanged with other routers. RIB 68 may include information defining a topology of a network. RPD 62 may resolve the topology defined by routing information in RIB 68 to select or determine one or more routes through the network. RPD 62 may then generate forwarding information base (FIB) 72 and update forwarding plane 63 with routes from FIB 72, where PFEs 40A-40N of forwarding plane 63 store these routes in respective FIBs. One or more routing protocols, such as IGP 66, maintains routing information in the form of routing information base (RIB) 68 that describes a topology of a network, and derives a forwarding information base (FIB) 72 in accordance with the routing information. In general, the routing information represents the overall topology of the network. IGP 66 interacts with kernel 70 (e.g., by way of API calls) to update routing information base (RIB) 68 based on routing protocol messages received by router 16B. RIB 68 may include information defining a topology of a network, including one or more routing tables and/or link-state databases.

Further details of one example embodiment of router 16B can be found in U.S. patent application Ser. No. 12/182,619, filed Jul. 30, 2008, entitled "STREAMLINED PACKET FORWARDING USING DYNAMIC FILTERS FOR ROUTING AND SECURITY IN A SHARED DATA PLANE," which is incorporated herein by reference. Control unit 30 may be implemented solely in software, or hardware, or may be implemented as a combination of software, hardware or firmware. For example, control unit 30 may include one or more processors which execute software instructions. In that case, routing engine 32 may include various software modules or daemons (e.g., one or more routing protocol processes, user interfaces and the like), and control unit 30 may include a computer-readable storage medium, such as computer memory or hard disk, for storing executable instructions.

Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 72 is generated based on selection of certain routes within the network and maps packet key information (e.g., destination information and other select information from a packet header) to one or more specific next hops and ultimately to one or more specific output interface ports of IFCs 42. Routing engine 32 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

As shown in FIG. 3, command line interface daemon 61 ("CLI 61") provides an interface by which an administrator or other management entity may modify the configuration of router 16B using text-based commands. Protocols 60 executing within routing engine 32 may include one or more MPLS protocols for establishing a LSP, which may be accumulated by IGP 66. For example, RSVP-TE 65 may generate and maintain a traffic engineering database 67, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGP 66 may, in turn, advertise the calculated bandwidth availability information in traffic engineering database (TED) 67 to other peer routers.

To illustrate, in some example, if router 16B represents an ingress router, RSVP-TE 65 may initiate CSPF process 48, which may compute a path through one or more other routers based on TED 67 and RIB 68. RSVP-TE 65 may signal this path as an LSP using a path message. RSVP-TE 65 may generate this path message in accordance with the RSVP-TE protocol. RSVP-TE 65 may further include within the message an indication that a label bound to the LSP by support routers along the LSP. RSVP-TE 65 may then send this path message via forwarding plane 63 to one or more other support routers. Routing engine 32 may store incoming and outgoing labels for LSPs as label data 78.

Routing engine 32 communicates data representative of a software copy of the FIB 72 into each of PFEs 40 to control forwarding of traffic within the forwarding plane. This allows the software FIB stored in memory (e.g., RAM) in each of PFEs 40 to be updated without degrading packet-forwarding performance of router 16B. In some instances, routing engine 32 may derive separate and different software FIBs for each respective PFEs 40. In addition, one or more of PFEs 40 include application-specific integrated circuits 74A-74N (ASICs 74) that PFEs 40 program with a hardware-copy of the FIB based on the software FIBs (i.e., hardware versions of the software FIBs) copied to each respective PFE 40.

Kernel 70 executes on master microprocessor 52 and may comprise, for example, a UNIX operating system derivative such as Linux or Berkeley Software Distribution (BSD). Kernel 70 processes kernel calls from IPG 66 and RSVP-TE 65, to generate forwarding information in the form of FIB 72 based on the network topology represented in RIB 68, i.e., performs route resolution and path selection. Typically, kernel 70 generates FIB 72 in the form of radix or other lookup trees to map packet information (e.g., header information having destination information and/or a label stack) to next hops and ultimately to interface ports of interface cards associated with respective PFEs 40. FIB 72 may associate, for example, network destinations with specific next hops and corresponding IFCs 42-48. For MPLS-related traffic forwarding, FIB 72 stores, label information that includes an incoming label, an outgoing label, and a next hop for a packet.

Master microprocessor 52 executing kernel 70 programs PFEs 40 to install copies of the FIB 72. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 74 are microcode-controlled chipsets (i.e., forwarding circuits) programmably configured by a slave microprocessor executing on each of PFEs 40. When forwarding packets, control logic with each ASIC 74 traverses the forwarding information (FIB 72) received from routing engine 32 and, upon reaching a FIB entry for the packet (e.g., a leaf node), microcode-implemented control logic automatically selects a forwarding next hop and processes the packets in accordance with the operations defined within the next hop. In this way, ASICs 74 of PFEs 40 process packets by performing a series of operations on each packet over respective internal packet forwarding paths as the packets traverse the internal architecture of router 16B. Operations may be performed, for example, on each packet based on any of a corresponding ingress interface, an ingress PFE 40, an egress PFE 40, an egress interface or other components of router 16B to which the packet is directed prior to egress, such as one or more service cards. PFEs 40 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 40 arranges forwarding structures as next hop data that can be chained together as a series of "hops" along an internal packet forwarding path for the network device. In many instances, the forwarding structures perform lookup operations within internal memory of ASICs 74, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 74 determines the manner in which a packet is forwarded or otherwise processed by PFEs 40 from its input interface on one of IFCs 42-48 to its output interface on one of IFCs 42-48.

In accordance with techniques of the disclosure, and with reference to the examples of FIGS. 1-3, router 16B may receive path message 22B at one of interfaces 42-48 from router 16C. Router 16C may have initially sent path message 22B to router 16B to configure LSP 20 in network 14. ASICS 74A may perform a lookup on path message 22B and send the contents of path message 22B to routing engine 32 via dedicated link 34. RPD 62, upon receiving the contents of path message 22B may alone, and/or in conjunction with RSVP-TE 65, determine one or more of PFEs 40A-40N that may be configured to forward network packets to LSP 20. For instance, the one or more of PFEs 40 that may be configured to forward packets for LSP 20 may have egress interfaces that are coupled to downstream routers such as router 16C.

Upon determining that PFEs 40A may be configured as an ingress PFE to forward network packets from upstream router 16A for LSP 20 and PFE 40N may be configured as an egress PFE to forward network packets to downstream router 16C, RPD 62 may generate one or more route-add messages to configure the forwarding structures (e.g., lookup tables and ASICs, among other configurable components of the forwarding plane) of PFEs 40A and 40N to forward packets for LSP 20 via switch fabric 36 and using one or more interfaces of PFEs 40A and 40N. Routing engine 32 may store state information 79, such as one or more identifiers of the one or more route-add messages in anticipation of receiving an ACK or NACK message that indicates whether the installation of the route succeeded or failed. In this way, routing engine 32 may remove the state information 79 once the one or more ACK or NACK messages are determined by routing engine 32.

As described in FIG. 2, the one or more route-add messages may include incoming label information for router 16B, which router 16B would advertise to upstream router 16A upon successful completion of the configuration of PFE 40A for LSP 20. When router 16A sends a packet having the incoming label for router 16B, PFE 40A performs a lookup on the packet based on the incoming label, swap the incoming label with an outgoing label previously received from downstream router 16C and forward the packet to router 16C. Thus, RPD 62 may use the incoming label information of path message 22B to configure PFE 40A to perform such a lookup.

As shown in FIG. 3, routing engine 32 may include kernel 70 that configures PFEs 40A, 40N based on the one or more route-add messages. In some examples, kernel 70 may execute one or more operations that configure forwarding structures of PFEs 40A, 40N in accordance with the data included in the one or more route-add messages. Upon receiving the one or more route-add messages, kernel 70 may initiate configuration of PFEs 40A, 40N.

If each of PFEs 40A, 40N is successfully configured in accordance with the route-add message, kernel 70 may generate one or more ACK messages that kernel 70 sends to RPD 62. Upon receiving the one or more ACK messages, RPD 62, operating alone and/or in conjunction with RSVP-TE 65, may generate a Resv message that includes the incoming label for router 16B. RPD 62, and/or RSVP-TE 65 may send the Resv message to PFE 40A, which forwards the Resv message to upstream router 16A. Router 16A may configure its forwarding plane to apply the incoming label of the Resv message to any packets for LSP 20 that are forwarded to router 16B. Router 16B may, upon performing a lookup of any such packets for LSP 20 based on the labels of the packets, swap the labels, and forward the packets to router 16C using an interface of PFE 40N.

In some examples, however, the installation of the route for LSP 20, based on the one or more route-add messages, may be unsuccessful or may be unlikely to succeed. For instance, in the example of FIG. 3, if kernel 70 determines that the route installation at one or more of PFE 40A has failed (e.g., the kernel received a hardware error code), kernel 70 may generate a non-predictive NACK (N-NACK) message. In some examples, a NACK message may be an N-NACK or a predictive NACK (P-NACK). An N-NACK may indicate that an actual configuration error has occurred when installing a route for an LSP. A P-NACK may indicate that an actual configuration error is likely occur (e.g., a probability of configuration error satisfies a threshold) when installing a route for an LSP. In some examples, kernel 70 may send the NACK message to RPD 62, via interprocess communication or other suitable communication techniques.

In the example of FIG. 3, the N-NACK message may include one or more identifiers that correspond to one or more identifiers of the one or more route-add messages. RPD 62 may remove the state information 79 corresponding to the route-add message, based on the identifier included in the N-NACK message that matches the identifier for the route-add message. If at least one of the one or more of PFEs 40A or 40N were successfully configured for LSP 20, RPD 62 may send instructions to kernel 70 to undo the configuration for LSP 20 or otherwise re-configure any forwarding units to not forward packets for LSP 20.

Upon determining the N-NACK message, RPD 62 alone, and/or in conjunction with RSVP-TE 65, may generate one or more messages to send to upstream and/or downstream routers for LSP 20. For instance, RPD 62 may send one or more PathTear messages to downstream routers for LSP 20. RPD 62 may send one or more PathErr messages to upstream routers for LSP 20. In this way, RPD 62 may determine in a deterministic manner, whether the installation of the path for LSP 20 succeeded. As such, RPD 62 may remove state information for route-add messages more accurately, thereby using storage resources more efficiently. Furthermore, in some examples, techniques of the disclosure may not wait for a particular time duration before sending PathTear and/or PathErr messages, thereby preventing fewer dropped packets that would otherwise occur if the PathTear and/or PathErr messages were only sent after the expiration of the particular time duration.

In some examples, techniques of the disclosure may generate a P-NACK that indicates an actual configuration error is likely occur (e.g., a probability of configuration error satisfies a threshold) when installing a route for an LSP. For instance, kernel 70 may include one or more components, such as monitor module 69, that monitor the system health of one or more components of forwarding plane 63, such as PFEs 40 and switch fabric 36, to name only a few examples. In some examples, monitor module 69 may be separate from kernel 70 and receive data from kernel 70 that is indicative of system health. The system health of forwarding plane 63 may be generated by monitor module 69 on a forwarding plane, a per-component of the forwarding plane, and/or a per-sub-component of the forwarding plane basis.

The system health of forwarding plane 63 may include and/or be based in part on one or more system health metrics of a forwarding unit, such as: processor load, memory consumption, packet drops, forwarding unit drain rates (e.g., the rate at which packets are enqueued when received and/or dequeued when forwarded), control-messaging drain rates (e.g., the rate of draining control-messaging coming from the routing engine), packet processing rates, hardware age/lifetime, hardware specifications (e.g., maximum storage capacity, maximum throughput) to name only a few examples. Monitor module 69 may periodically and/or asynchronously receive data indicative of system health from kernel 70 (and/or directly from forwarding plane 63), which determines such data based on operations performed with respect to components of forwarding plane 63. For instance, kernel 70 may perform operations that request, from components of forwarding plane 63, statistics and/or data indicative of system health, which can be used by monitor module 69 to generate the system health metrics. Although shown in FIG. 3 as implemented in control plane 61, monitor module 69 may be implemented in forwarding plane 63, such as at one or more of PFEs 40.

To illustrate the use of a P-NACK in the example of FIG. 3, monitor module 69 may monitor the system health of PFEs 40, on a per-PFE basis. In response to receiving path message 22B, rather than automatically generating one or more route-add messages to configure the forwarding structures of PFEs 40A and 40N to forward packets for LSP 20, RPD 62 may determine the system health of PFEs 40A and 40N by querying monitor module 69. In other examples, as described in this disclosure, RPD 62 may, in response to receiving path message 22B, automatically generate one or more route-add messages and also query monitor module 69 to determine the system health of one or more components of forwarding plane 63.

Monitor module 69 may determine, based on system health information, that installation of a route for LSP 20 is likely to fail. For instance, installation of the route for LSP 20 at PFE 40A is not likely to fail but installation of the route for LSP 20 at PFE 40N is likely fail. For instance, monitor module 69 may determine a score or probability based at least in part on one or more system health metrics for one or more forwarding units, wherein the score or probability indicates the likelihood that installing the route will succeed or fail. In some examples, the score or probability may be on a per-PFE basis, while in other examples the score or probability may be on a per-route installation basis for an LSP.

RPD 62 may compare the score or probability to a threshold to determine whether the score or probability satisfies the threshold. In some examples, the score or probability may satisfy the threshold if the score or probability is greater than or equal to the threshold. In other examples, the score or probability may satisfy the threshold if the score or probability is less than or equal to the threshold. In some examples, the threshold may be a preset value that is defined at the initial programming and assembly of router 16B. In some examples, an administrator or user may input a particular value that is set as the threshold. If the score or probability does not satisfy the threshold, monitor module 69 may send data to RPD 62, which causes RPD 62 to generate and send one or more route-add messages to kernel 70 that are used to configure the corresponding PFEs for the LSP as described in this disclosure. If, however, the score or probability does satisfy the threshold, monitor module 69 may send a P-NACK to RPD 62.

In response to receiving the P-NACK, RPD 62 may perform one or more operations. For instance, in some examples, RPD 62 may treat a P-NACK as an N-NACK, and may therefore immediately send one or more PathTear and/or PathErr messages to upstream and/or downstream routers for LSP 20. In such examples, RPD 62 may not generate a route-add message and/or send a route-add message to forwarding plane 63.

In some examples, RPD 62 may not treat a P-NACK as an N-NACK. For instance, rather than immediately sending one or more PathTear and/or PathErr messages or not generating a route-add message, RPD 62 may initiate a timer and generate a route-add message. Specifically, RPD 62 may generate a route-add message and send the route-add message to kernel 70 as described in this disclosure. RPD 62 may generate state information in state information 79 that corresponds to the route-add messages, such that when an ACK or N-NACK is received from kernel 70, the state information may be removed. Upon generating or sending the route-add message, RPD 62 may initiate a timer included in timers 76. The timer may expire after a particular time duration. The time duration may be a preset value that is defined at the initial programming and assembly of router 16B. In some examples, an administrator or user may input a particular value that is set as the time duration.

If RPD 62 receives an ACK message before the timer expires, RPD 62 may determine that the configuration of forwarding plane 63 for LSP 20 was successful. Accordingly, RPD 62 may remove the state information for the route-add message and send its incoming label upstream to router 16A. In this way, router 16B may forward network packets for LSP 20 to router 16B by applying the incoming label advertised by router 16B to the packet.

If RPD 62 receives an N-NACK message before the timer expires, or the timer expires and neither an N-NACK nor an ACK has been received from kernel 70, RPD 62 may determine that the configuration of forwarding plane 63 for LSP 20 was unsuccessful. Accordingly, RPD 62 may remove the state information for the route-add message. RPD 62 may also send one or more PathErr and/or PathTear messages to upstream and/or downstream routers for LSP 20. In this way, router 16B may notify one or more other routers for LSP 20 that the installation of the route for LSP 20 was unsuccessful at router 16B. In some examples, the setting and use of a timer may only occur in the case where RPD 62 receives a P-NACK message. In other examples, the setting and use of a timer may occur where RPD 62 receives a P-NACK or an N-NACK message.

In some examples, the techniques described above with respect to RPD 62 using a timer in response to a P-NACK may be applied based on RPD 62 determining whether one or more criteria are satisfied. For instance, a criterion may be whether an LSP is being initially configured for the first time. An LSP may be initially configured for the first time if the forwarding structures of forwarding plane 63 are not configured to forward packets for the LSP at the time that the route-add message for the LSP is generated by RPD 62. If RPD 62 determines that the LSP is being initially configured for the first time, RPD 62 may apply the techniques described above with respect to RPD 62 using a timer in response to a P-NACK. If, however, RPD 62 determines that the LSP is not being initially configured for the first time, RPD 62 may apply the techniques described above with respect to treating a P-NACK as an N-NACK.

In some examples, a criterion may be whether the LSP has already been configured and is being reconfigured. An LSP may have already been configured and is being reconfigured if the forwarding structures of forwarding plane 63 are configured to forward packets for the LSP at the time that the route-add message for the LSP is generated by RPD 62. If RPD 62 determines that the LSP has already been configured and is being reconfigured, RPD 62 may apply the techniques described above with respect to RPD 62 using a timer in response to a P-NACK. If, however, RPD 62 determines that the LSP is not being initially configured for the first time and is not being reconfigured, RPD 62 may apply the techniques described above with respect to treating a P-NACK as an N-NACK.

As described above, in some examples, RPD 62, in response to receiving path message 22B, may send a route-add message to kernel 70 and query monitor module 69 for system health metrics. In such examples, one or more of PFEs 40 may be partially configured before a P-NACK or N-NACK is generated, or a timer expires. Accordingly, if at least one of the one or more PFEs 40 was successfully configured for LSP 20 but a different one of the one or more PFEs 40 failed to be configured, RPD 62, may send instructions to kernel 70 to undo the configuration for LSP 20 or otherwise re-configure any of PFEs 40 to not forward packets for LSP 20.

In some examples, routing engine 32 may execute at least one liveness detection protocol. A liveness detection protocol may determine whether one or more other routers and/or links are active and/or otherwise operational by sending periodic messages (e.g., self-ping messages). For instance, router 16B may periodically send, based at least in part on a liveness detection protocol, liveness detection messages to at least one other network device is included in LSP 20, the at least one other network device being, for example, one of router 16A, 16C, or 16D. In accordance with techniques of the disclosure, RPD 62 or another component of routing engine 32 that performs liveness detection may terminate, based at least in part on the NACK message, the periodic sending of the liveness detection messages. In other words, upon RPD 62 receiving a NACK message, RPD 32 may stop the periodic sending of the liveness detection messages. In such examples, a NACK may trigger a PathErr message towards the ingress LER, e.g., router 16A. The PathErr message could be used to indicate to the ingress LER that the LSP is not going to be configured. In response the ingress LER, could terminate any mechanisms it might have in place (as a palliative) to test the data plane liveness of the LSP.

In some examples, RPD 62 may save memory used for storing state information 79 by grouping a set of routes for installation into a single route-installation message. In some examples, the set of routes may be a contiguous range of routes, while in other examples, the set of routes may be a non-contiguous group of routes. In any case, upon determining that multiple routes must be installed into forwarding plane 63, RPD 62 (e.g., a first component of routing engine 32) may generate a route-add message that includes data to configure at least one of PFEs 40 (e.g., at least one forwarding unit) to forward the network packets for a plurality of routes. For instance, the route-add message may include route definitions for each of a set of routes. RPD 62 may store a single instance of state information 79 for the route-add message that includes the data for the plurality of routes. In this way, rather than generating a separate route-add message for each route, and storing separate state information for separate each route-add message, the techniques may generate, for a set of routes, a single route-add message and single portion of state information for the single-route add message. The state information may be removed in the same way as other state information as described in this disclosure. Accordingly, instead of tracking a pending-ACK entry on a per route basis, the techniques may track such entries on a per-range basis where the tracking for whether or not a route is installed in the PFE may be tracked for a range of routes instead of on a per route basis.

In some examples, router 12B may send, irrespective of any particular time duration and to at least one other network device, a label-switched path configuration message, such as a Resv message only if at least one of: router 12B has generated an ACK message in response to a route-add message, or router 12B has generated a NACK message. In other words, router 12B may only send the Resv message in response to an ACK or a NACK message, and the sending the of the Resv message may not be based on a particular timer or time duration.

In some examples, router 12B may implement techniques for handling potential false-positives of P-NACKSs. For instance, RPD 62 (or some other component of router 16B) may tear-down an LSP or prepare to tear down the LSP, while waiting for a NACK. As such, while waiting for generation the NACK message, router 16B may prepare termination of the configuration of at least one forwarding unit for the LSP, and responsive to generating the NACK message, complete termination of the of the configuration of the at least one forwarding unit for the LSP. In some examples, preparing termination of the LSP may include one or more of: identifying one or more forwarding units associated with the LSP, generating one or more messages that include data to terminate the LSP, to name only a few examples. In some examples, preparing termination of an LSP may include only a subset of a set of operations, where the set of operations when executed completes termination of the LSP.

Although techniques of the disclosure are described in FIG. 3 with respect to components, such as RPD 62, state information 79, monitor module 69, and kernel 70, each being implemented in control plane 61, one of more of the techniques may be implemented in forwarding plane 63. For instance, one or more of PFEs 40 may implement one or more of the techniques of this disclosure described with respect to RPD 62, state information 79, monitor module 69, and kernel 70. In some examples, the techniques of one or more components of RPD 62, state information 79, monitor module 69, and kernel 70 may be combined into one or more components. As an example, the techniques of monitor module 69 may be implemented separately in monitor module 69, or may be included in RPD 62, or included in kernel 70, or implemented as a module in one or more of PFEs 40, to illustrate only a few possible implementations.

The architecture of router 16B illustrated in FIG. 3 is shown for exemplary purposes only. This disclosure is not limited to this architecture. In other examples, router 16B may be configured in a variety of ways. In one example, some of the functionally of control unit 30 may be distributed within IFCs 42-48. Control unit 30 may be implemented solely in software, or hardware, or may be implemented as a combination of software, hardware, or firmware. For example, control unit 30 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 30 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 4:
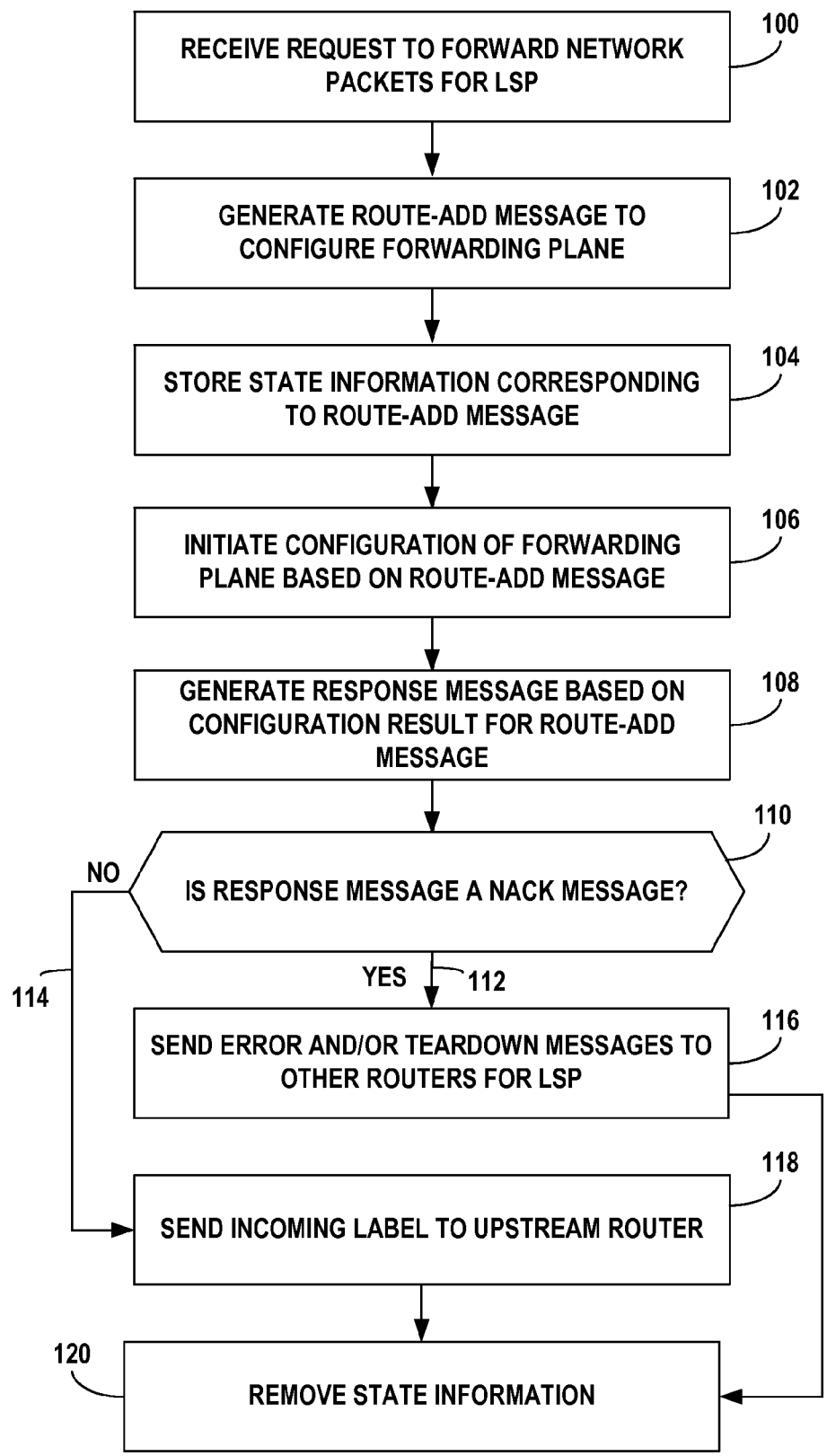
FIG. 4 is a flowchart that illustrates example operations of a router of FIGS. 1-3 that implements NACK messages, in accordance with techniques of this disclosure.

FIG. 4 is a flowchart that illustrates example operations of a router of FIGS. 1-3 that implements NACK messages, in accordance with techniques of this disclosure. For purposes of illustration only, the example operations are described below within the context of router 16B, as shown in FIGS. 1-3. In the example of FIG. 4, router 16B may receive a request to forward network packets for LSP 20, as shown in FIG. 1 (100). In some examples, the request may be a path message from upstream router 16A. Upon receiving the request, router 16B may generate a route-add message (102). The route-add message may include information to configure the forwarding plane of router 16B to forward network packets for LSP 20. In some examples, the route-add message may identify one or more PFEs of router 16B that may receive network packets from an upstream router for LSP 20 and/or forward network packets to a downstream router for LSP 20. Router 16B may generate the route-add message in the control plane, as described in FIGS. 1-3, and the kernel of router 16B may use the route-add message to configure the forwarding plane for LSP 20.

In some examples, router 16B also stores state information for the route-add message (104). In this way, router 16B may determine whether the route for LSP 20 was configured successfully based on the receipt of an ACK message or a NACK message. The kernel of router 16B may initiate the configuration of the forwarding plane for LSP 20, based on the contents of the route-add message (106). For instance, the kernel of router 16B may perform one or more operations to configure the forwarding structures of router 16B using the data from the route-add message.

In some examples, the kernel of router 16B may generate a response message (e.g., a NACK or ACK) based on the configuration result for the route-add message (108). That is, the kernel of router 16B may determine whether the configuration was successful, such as based on hardware return codes that are provided by components of the forwarding plane, such as the PFEs. Based on such return codes or other suitable information, router 16B may generate a NACK, if the return code indicates an error or an ACK if the return code indicates a successful configuration.

Router 16B may determine whether the response message is a NACK or an ACK message (110). If the response message is not a NACK message, e.g., the response message is an ACK message, router 16B may send its incoming label to upstream router 16A, as described in FIGS. 1-3 (116). If the response message is a NACK message, router 16B may send one or more PathTear and/or PathErr messages to upstream and/or downstream routers for LSP 20 (118). Regardless of whether the response message is a NACK message or an ACK message, router 16B may also remove, based on information included in the response message, state information that corresponds to the route-add message (120). For instance, router 16B may determine an identifier in the response message that corresponds to an identifier included in the route-add message. Based on the identifier, router 16B may remove state information corresponding to the route-add message.

Figure 5:
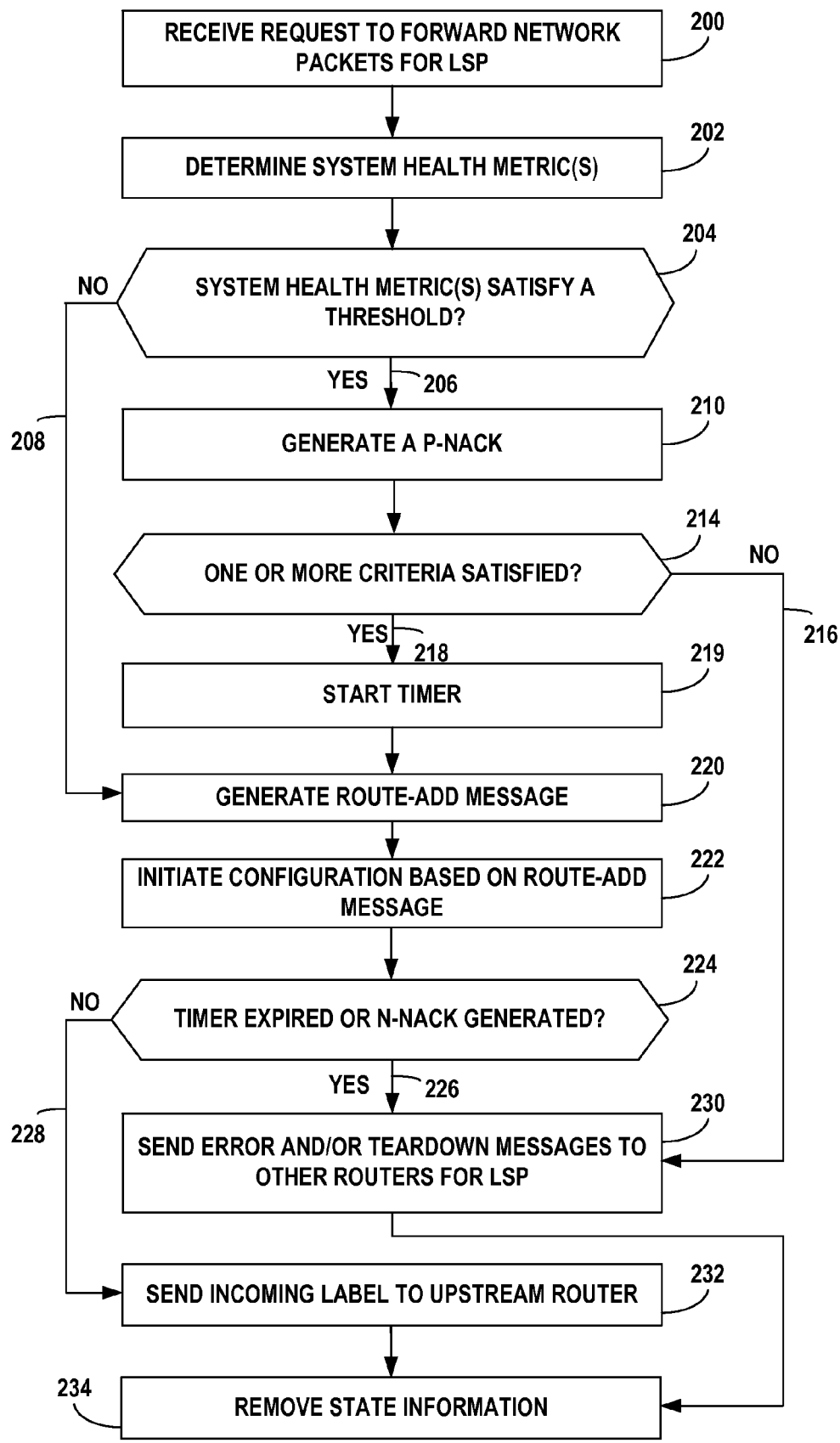
FIG. 5 is a flowchart that illustrates example operations of a router of FIGS. 1-3 that implements predictive NACK (P-NACK) messages, in accordance with techniques of this disclosure.

FIG. 5 is a flowchart that illustrates example operations of a router of FIGS. 1-3 that implements predictive NACK (P-NACK) messages, in accordance with techniques of this disclosure. For purposes of illustration only, the example operations are described below within the context of router 16B, as shown in FIGS. 1-3. Router 16B may receive a request to forward network packets for LSP 20, as shown in FIG. 1 (200). In some examples, the request may be a path message from upstream router 16A. Router 16B may determine one or more system health metrics of one or more forwarding units of router 16B, as described in this disclosure (202).

Router 16B may determine whether the system health metrics satisfy a threshold (204). In the example of FIG. 5, if the system health metrics do not satisfy the threshold (208), router 16B may generate a route-add message (220). In other words, if the threshold is not satisfied, the system health of router 16B is such that installation of the route for LSP 20 will or is likely to succeed. If the threshold is satisfied (206), router 16B may generate a P-NACK (210). In other words, if the threshold is satisfied, the system health of router 16B is such that installation of the route for LSP 20 will not or is unlikely to succeed.

Router 16B, upon determining that a P-NACK was generated, may determine whether one or more criteria are associated with the route installation for LSP 20. For instance, router 16B may determine whether one or more criteria for the route installation for LSP 20 are satisfied (214). If one or more criteria for the route installation for LSP 20 are not satisfied (216), router 16B may send one or more PathErr and/or PathTear messages to other upstream and/or downstream routers for LSP 20 (230). If one or more criteria for the route installation for LSP 20 are satisfied (218), router 16B may perform one or more operations associated with the criteria. For example, in FIG. 5, router 16B may start a timer (219) and generate a router-add message (220). Router 16B may initiate configuration of its forwarding plane based on the route-add message (222).

While configuring its forwarding plane, router 16B may wait for one or more conditions to occur. In some examples, router 16B may determine whether the timer has expired or an N-NACK has been generated (224). If an ACK message is generated by router 16B before the timer expires and no N-NACK is generated (228), router 16B may send its incoming label upstream to router 16A (232). In this example, router 16B is successfully configured and may forward network packets for LSP 20.

If, however, router 16B determines that the timer has expired or an N-NACK has been generated due to an actual failure in installing the route for LSP 20, router 16B may send one or more PathTear and/or PathErr to other routers in network 14, such as router 16A, 16C, or 16D, to name only a few examples (230). Router 16B may remove state information corresponding to the route-add message (234). In some examples, if a P-NACK results in immediate sending of the error/teardown messages without generating route-add messages, router 16B may not need to remove state information for such route because no route-add message was ever generated. Router 16B may remove the state information in response to the timer expiring, receiving an ACK message, and/or receiving a NACK message.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

Various embodiments of have been described. These and other embodiments are within the scope of the following claims.

What is claimed is:

1. A method comprising:
   receiving, by a network device of a plurality of network devices, a request to forward network packets for a label-switched path (LSP);
   responsive to receiving the request, initiating, by the network device, configuration of at least one forwarding unit of the network device to forward network packets for the LSP;
   generating, by the network device, a no-acknowledgement (NACK) message that indicates the at least one forwarding unit is not configured to forward the network packets for the LSP; and
   terminating, by the network device and based at least in part on the NACK message, the configuration of the at least one forwarding unit for the LSP.

2. The method of claim 1, wherein initiating configuration of the at least one forwarding unit of the network device to forward network packets for the LSP comprises:
   determining, by the network device, that the at least one forwarding unit is communicatively coupled to at least one other network device that is included in the LSP, the at least one other network device included in the plurality of network devices;
   responsive to determining that the at least one forwarding unit is communicatively coupled to the at least one other network device, generating, by a first component of the network device, a route-add message that includes data to configure the at least one forwarding unit to forward the network packets for the LSP;
   storing, by the first component of the network device, state information that identifies the route-add message; and
   sending, by first the component of the network device and to a second component of the network device, the route-add message.

3. The method of claim 1, further comprising:
   determining, by the network device, at least one system health metric of the at least one forwarding unit that is indicative of whether the configuration of the at least one forwarding unit is likely to fail;
   responsive to receiving the request to forward network packets for the LSP, determining, by the network device, whether the at least one system health metric satisfies the threshold; and
   wherein the network device generates the NACK message in response to determining that the at least one system health metric satisfies the threshold.

4. The method of claim 3, wherein the at least one system health metric is based at least in part on at least one of: processor load; memory consumption; quantity of packet drops; forwarding unit drain rate; packet processing rate; hardware age; or maximum hardware specification limitation.

5. The method of claim 1, wherein the NACK message is a predictive NACK (P-NACK) message, further comprising:
determining, by the network device, at least one criterion that is based at least in part on the LSP;
responsive to determining that the at least one criterion is satisfied, generating, by a first component of the network device, a route-add message that includes data to configure the at least one forwarding unit to forward the network packets for the LSP;
storing, by the first component of the network device, state information that identifies the route-add message; and
sending, by first the component of the network device and to a second component of the network device, the route-add message.

6. The method of claim 5, further comprising:
starting, by the network device, a timer that expires after a particular time duration; and
wherein terminating the configuration of the at least one forwarding unit for the LSP comprises terminating, by the network device, the configuration of the at least one forwarding unit for the LSP based at least in part on the timer expiring before receiving, in response to the route-add message, at least one of an ACK message or a non-predictive NACK (N-NACK) message.

7. The method of claim 5, wherein terminating the configuration of the at least one forwarding unit for the LSP comprises:
removing, by the network device, previously stored state information that corresponds to the route-add message.

8. The method of claim 1, wherein terminating the configuration of the at least one forwarding unit for the LSP comprises:
determining, by the network device, at least one other network device that is included in the LSP, the at least one other network device included in the plurality of network devices;
sending, by the network device, at least one message to the at least one other network device that is indicative of the terminated configuration of the at least one forwarding unit for the LSP.

9. The method of claim 1,
wherein the NACK is at least one of a predictive NACK (P-NACK) message or a non-predictive NACK (N-NACK message), and
wherein the NACK message comprises an identifier that is further included in a route-add message previously generated by the network device to configure the at least one forwarding unit for the LSP.

10. The method of claim 1, further comprising:
executing, by the network device, at least one liveness detection protocol;
periodically sending, by the network device and based at least in part on the liveness detection protocol, liveness detection messages to at least one other network device that is included in the LSP, the at least one other network device included in the plurality of network devices; and
terminating, by the network device and based at least in part on the NACK message, the periodic sending of the liveness detection messages.

11. The method of claim 1, further comprising:
generating, by a first component of the network device, a route-add message that includes data to configure the at least one forwarding unit to forward the network packets for a plurality of routes; and
storing, by the first component of the network device, a single instance of state information for the route-add message that includes the data for the plurality of routes.

12. The method of claim 1, further comprising:
sending, irrespective of any particular time duration and to at least one other network device of the plurality of network devices, a label-switched path configuration message only if at least one of:
the network device has generated an ACK message in response to a route-add message, or
the network device has generated the NACK message.

13. The method of claim 1, further comprising:
while waiting for generation the NACK message, preparing, by the network device, termination of the configuration of the at least one forwarding unit for the LSP; and
responsive to generating the NACK message, completing, by the network device, termination of the of the configuration of the at least one forwarding unit for the LSP.

14. A network device, comprising:
at least one processor;
at least one module operable by the at least one processor to:
receive a request to forward network packets for a label-switched path (LSP);
responsive to receiving the request, initiate configuration of at least one forwarding unit of the network device to forward network packets for the LSP;
generate a no-acknowledgement (NACK) message that indicates the at least one forwarding unit is not configured to forward the network packets for the LSP; and
terminate based at least in part on the NACK message, the configuration of the at least one forwarding unit for the LSP.

15. The network device of claim 14,
wherein the at least one module is operable by the at least one processor to determine that the at least one forwarding unit is communicatively coupled to at least one other network device that is included in the LSP, the at least one other network device included in the plurality of network devices;
wherein a first component of the network device, responsive to determining that the at least one forwarding unit is communicatively coupled to the at least one other network device, generates a route-add message that includes data to configure the at least one forwarding unit to forward the network packets for the LSP;
wherein the first component stores state information that identifies the route-add message; and
wherein the first component sends to a second component of the network device, the route-add message.

16. The network device of claim 14, wherein the at least one module operable by the at least one processor to:

determine at least one system health metric of the at least one forwarding unit that is indicative of whether the configuration of the at least one forwarding unit is likely to fail;

responsive to receiving the request to forward network packets for the LSP, determine whether the at least one system health metric satisfies the threshold; and wherein the network device generates the NACK message in response to determining that the at least one system health metric satisfies the threshold.

17. The network device of claim 16, wherein the at least one system health metric is based at least in part on at least one of: processor load; memory consumption; quantity of packet drops; forwarding unit drain rate; packet processing rate; hardware age; or maximum hardware specification limitation.

18. The network device of claim 14, wherein the NACK message is a predictive NACK (P-NACK) message;

wherein the at least one module operable by the at least one processor to determine at least one criterion that is based at least in part on the LSP;

wherein a first component of the network device, responsive to determining that the at least one criterion is satisfied, generates a route-add message that includes data to configure the at least one forwarding unit to forward the network packets for the LSP;

wherein the first component of the network device stores state information that identifies the route-add message; and wherein the first component of the network device sends to a second component of the network device, the route-add message.

19. The network device of claim 18, wherein the at least one module operable by the at least one processor to:

start a timer that expires after a particular time duration; and terminate the configuration of the at least one forwarding unit for the LSP based at least in part on the timer expiring before receiving, in response to the route-add message, at least one of an ACK message or a non-predictive NACK (N-NACK) message.

20. The network device of claim 18, wherein the at least one module operable by the at least one processor to:

remove previously stored state information that corresponds to the route-add message.

21. The network device of claim 14, wherein the at least one module operable by the at least one processor to:

determine at least one other network device that is included in the LSP, the at least one other network device included in the plurality of network devices;

send at least one message to the at least one other network device that is indicative of the terminated configuration of the at least one forwarding unit for the LSP.

22. The network device of claim 14, wherein the NACK is at least one of a predictive NACK (P-NACK) message or a non-predictive NACK (N-NACK message), and wherein the NACK message comprises an identifier that is further included in a route-add message previously generated by the network device to configure the at least one forwarding unit for the LSP.

23. The network device of claim 14, wherein the at least one module operable by the at least one processor to:

execute at least one liveness detection protocol;

periodically send, based at least in part on the liveness detection protocol, liveness detection messages to at least one other network device that is included in the LSP, the at least one other network device included in the plurality of network devices; and terminate, based at least in part on the NACK message, the periodic sending of the liveness detection messages.

24. The network device of claim 14, wherein a first component of the network device generates a route-add message that includes data to configure the at least one forwarding unit to forward the network packets for a plurality of routes; and wherein the first component of the network device stores a single instance of state information for the route-add message that includes the data for the plurality of routes.

25. The network device of claim 14, wherein the at least one module operable by the at least one processor to:

send, irrespective of any particular time duration and to at least one other network device of the plurality of network devices, a label-switched path configuration message only if at least one of:

the network device has generated an ACK message in response to a route-add message, or the network device has generated the NACK message.

26. The network device of claim 14, wherein the at least one module operable by the at least one processor to:

while waiting for generation the NACK message, prepare termination of the configuration of the at least one forwarding unit for the LSP; and responsive to generating the NACK message, complete termination of the of the configuration of the at least one forwarding unit for the LSP.

27. A computer-readable medium comprising instructions for causing a programmable processor of a network device to:

receive a request to forward network packets for a label-switched path (LSP);

responsive to receiving the request, initiate configuration of at least one forwarding unit of the network device to forward network packets for the LSP;

generate a no-acknowledgement (NACK) message that indicates the at least one forwarding unit is not configured to forward the network packets for the LSP; and terminate based at least in part on the NACK message, the configuration of the at least one forwarding unit for the LSP.

* * * * *